United States Patent
Bak et al.

(10) Patent No.: US 6,901,478 B2
(45) Date of Patent: May 31, 2005

(54) RAID SYSTEM AND MAPPING METHOD THEREOF

(75) Inventors: Yuhyeon Bak, Daejeon (KR); Chang-Soo Kim, Daejeon (KR); Gyoung Bae Kim, Daejeon (KR); Bum Joo Shin, Daejeon (KR)

(73) Assignee: Electronics and Telecommunication Research Institute, Daejeon (KR)

( * ) Notice: Subject to any disclaimer, the term of this patent is extended or adjusted under 35 U.S.C. 154(b) by 268 days.

(21) Appl. No.: 10/232,747

(22) Filed: Sep. 3, 2002

(65) Prior Publication Data

US 2003/0105923 A1 Jun. 5, 2003

(30) Foreign Application Priority Data

Oct. 26, 2001 (KR) ........................................ 2001-66218

(51) Int. Cl.[7] ............................................... G06F 12/08
(52) U.S. Cl. ........................ 711/114; 711/206; 711/202
(58) Field of Search ................................ 711/114, 202, 711/205, 206

(56) References Cited

U.S. PATENT DOCUMENTS

| | | |
|---|---|---|
| 6,052,759 A | 4/2000 | Stallmo et al. |
| 6,058,489 A | 5/2000 | Schultz et al. |
| 6,609,176 B1 * | 8/2003 | Mizuno ...................... 711/114 |
| 6,651,154 B1 * | 11/2003 | Burton et al. ............... 711/202 |

FOREIGN PATENT DOCUMENTS

| | | | |
|---|---|---|---|
| KR | 1999-51729 | 7/1999 | .......... G06F/12/16 |
| KR | 1999-53164 | 7/1999 | ............. G06F/3/06 |

* cited by examiner

*Primary Examiner*—Mano Padmanabhan
*Assistant Examiner*—Midys Inoa
(74) *Attorney, Agent, or Firm*—Mayer, Brown, Rowe & Maw LLP

(57) ABSTRACT

A system having RAID levels includes a storage medium, a memory and a CPU. The storage medium has at least two disks. The memory stores a striping zone information table of total disks in which a physical address of data recorded in a disk of the storage medium is converted into a logic address. The CPU modifies a striping zone information table stored in the memory in case a new disk is added to the storage medium, stores the modified striping zone information table in the memory, converts a logic address of data to be written/read out from the stored table into a physical address in response to the disk writing/reading instructions, searches positions of a corresponding disk D and a physical block B and controls writing or reading out data.

6 Claims, 5 Drawing Sheets

RAID SYSTEM AND MAPPING METHOD THEREOF

FIELD OF THE INVENTION

The present invention relates to a RAID (Redundant Array of Inexpensive (or Independent) Disks) system for storing data by using a striping technique in order to improve an input/output performance of disks, and a mapping method thereof; and, more particularly, to a system and a method for having the flexible number of disks and minimizing a service delay caused by an added disk by using both a striping zone information table and a mapping equation without rearranging total disks when a disk is added during a system operation.

BACKGROUND OF THE INVENTION

A popularization of the Internet has brought a rapid change of working environments and an explosive increase in the amount of data to be stored. Generally, a multimedia development further leads to an enlarged size of data processed in a general computer, and an amount of the data to be processed has also increased by the growing number of computer users. However, general information storage systems, e.g., a data management system of a client server connected to one server for storing and managing the data and a network file system based on a file server, are subject to limitations in processing the increased data.

In order to effectively process the increased amount of data, a RAID technology is recently employed in an information storage system. The RAID basically means one large drive is replaced by an array of small drives to maximize a maximum data transmission bandwidth by using all input/output bandwidths of the array. The RAID technology provides several levels, e.g., RAID levels 0, 3, 4 and 5 storing data by distributing the data. That is, the RAID technology employs a striping scheme, all the data being written in a disk sequentially by using the striping scheme. Thus, the parallel characteristics of the drives is enhanced by simultaneously performing I/O into the disk.

When a capacity of a system for storing data by using a striping technique is to be expanded by adding a new disk, on the other hand, the process of data is performed as follows.

FIG. 1 is a flowchart for recording data in a disk by using a conventional RAID striping technique. Referring to FIG. 1, the conventional system checks whether there is an additional disk (step 10). In case there is no additional disk and the system receives a disk writing instruction (step 14), a logic address is converted into a physical address by using an equation or a table and then writing on a disk is performed (step 16). However, in case there is an additional disk, data recorded in an existing disk is reconstituted (step 12). Next, if the system receives the disk writing instruction (step 14), writing on total disks is performed by using a striping technique (step 16). If an instruction to read out a disk is received to the system, on the other hand, reading out the total disks is performed (step 18).

FIG. 2 depicts a conventional example for rearranging existing data when a new disk is added.

When one new disk Disk3 is added during a system operation performed by using existing three disks Disk0, Disk1 and Disk2, data having addresses 0–11 recorded in the existing three disks Disk0 to Disk2 are distributed sequentially to the total four disks Disk0 to Disk3 and written in those disks by using the striping technique to thereby rearrange the data.

A conventional mapping of a logic address and a physical address is carried out in striping data by using two methods: One is to use a general equation and the other is to use a table. A first method using the general equation is the simplest one to select a corresponding disk by using the logic address and the number of disks and performing a modular operation thereto. Moreover, a position to store the logic address inside a disk (the physical address) can be obtained by dividing the logic address by the number of disks. For example, if the number of disks is three, the position to store a logic address 10 becomes a third block of a first disk by an Eq. (1) as follows;

position of a disk: n % d, 10% 3=1 position to store the disk: n÷d, 10÷3=3     Eq. (1)

wherein d is a logic address and n represents the number of disks.

The first method has an advantage in that a mapping can be carried out simply without an aid of additional data because a position disk to store the logic address is determined by performing the modular operation by the number of the disks.

The system, however, is stopped when adding a new disk during the system operation. Then, the disk is added physically to reboot the system. Next, existing data are rearranged by using a new equation using the disk added in the system. In this case, data and parity blocks distributed and stored in existing disks are to read out by rearranging the data and are written newly on total disks including the disk re-added in accordance with an arrangement way. Therefore, in a method for mapping a logic address as a physical address by an equation, a performance of a system is deteriorated by a slow response of the system and an overhead thereof, represented from the cost of a memory for a temporary storage of data from a disk and time in reading out the disk and writing on the disk several times when rearranging the blocks.

In the meantime, a second method for using a table capable of mapping a logic address and a physical address is not influenced by a change in the number of disks. Besides, various flexibilities such as a snapshot and a correction of a position to store an error block can be provided.

TABLE 1

| logic address | disk No. | physical address |
|---|---|---|
| 0K | 1 | 0K |
| 1K | 2 | 0K |
| 2K | 3 | 0K |
| 3K | 1 | 1K |
| 4K | 2 | 1K |
| 5K | 3 | 1K |
| ... | ... | ... |

However, the mapping of the logic address and the physical address for using a table as shown in the table 1 has a disadvantage in that a large storage space is needed for the table because there is needed a table space corresponding to the number of the logic addresses.

SUMMARY OF THE INVENTION

It is, therefore, an object of the present invention to provide a RAID system capable of reducing a system overhead represented from an additional disk and providing a flexibility and simplicity from the use of an equation and a table by performing a data striping without rearranging total disks when a new disk is added in order to expand the capacity of the system.

Another object of the present invention is to provide a method of a RAID system for mapping and processing data capable of adapting a change in the number of disks and reducing the number of the data to be managed by performing a data striping without rearranging total disks because an equation and a table are for use in a mapping of a logic and a physical address when there is an additional disk.

In accordance with one aspect of the invention, there is provided a system having RAID levels, including: a storage medium for having at least two disks; a memory for storing a striping zone information table of total disks in which a physical address of data recorded in a disk of the storage medium is converted into a logic address; and CPU for modifying a striping zone information table stored in the memory in case a new disk is added to the storage medium, storing the modified striping zone information table in the memory, converting a logic address of data to be written/read out from the stored table into a physical address in response to writing/reading instructions of the disk, searching positions of a corresponding disk D and a physical block B and controlling writing or reading out the data.

In accordance with another aspect of the invention, there is provided a method for mapping and processing a logic address to a physical address of a system having RAID levels when there is an additional disk therein, including the steps of: (a) determining whether there is an additional disk in a storage medium of the system; (b) modifying a striping zone information table stored in the memory in case there is the additional disk in the storage system and storing the modified striping zone information table in the memory; (c) determining whether the disk writing instruction is received in case there is no additional disk after storing the modified striping zone information table; and (d) converting, if the disk writing instruction is received, a logic address of data to be written from the stored table into a physical address, searching positions of a corresponding disk D and a physical block B and writing data thereon.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Preferred embodiments of the present invention will now be described in detail with reference to the accompanying drawings.

Figure 1:
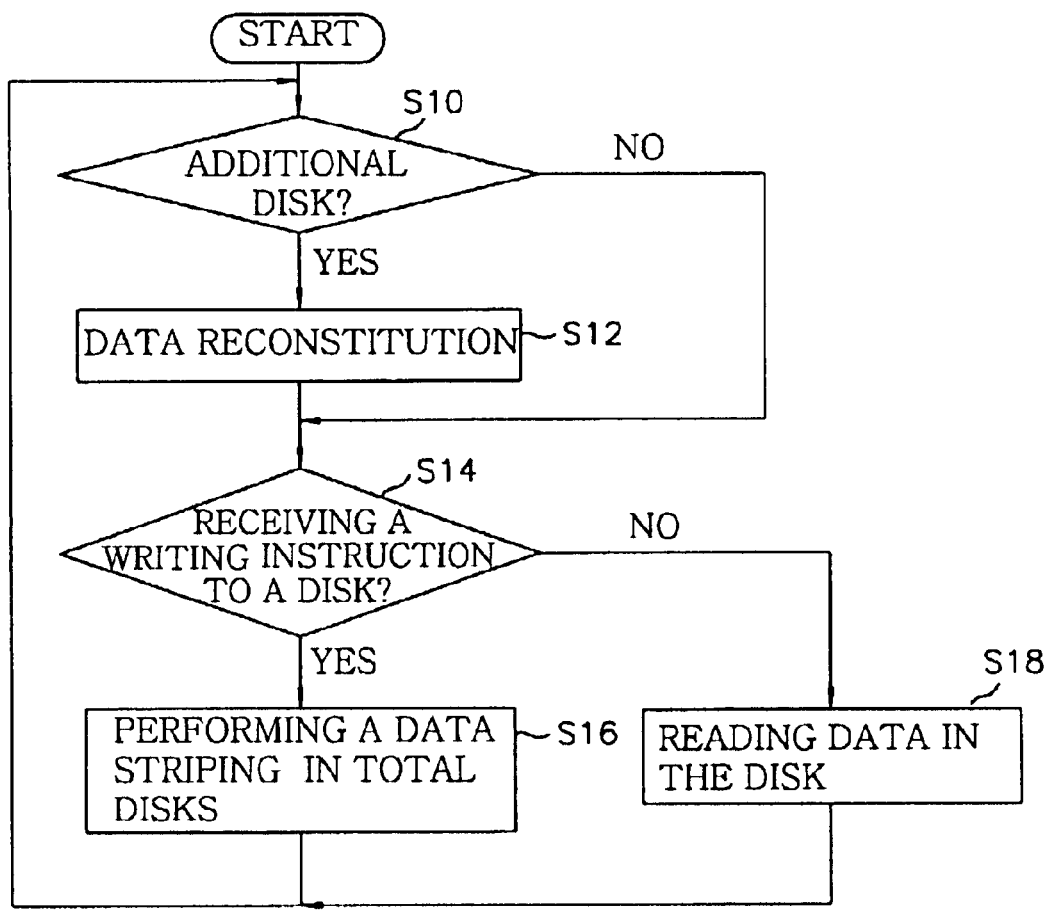
FIG. 1 is a flowchart for recording data in a disk by using a conventional RAID striping method.
Figure 2:
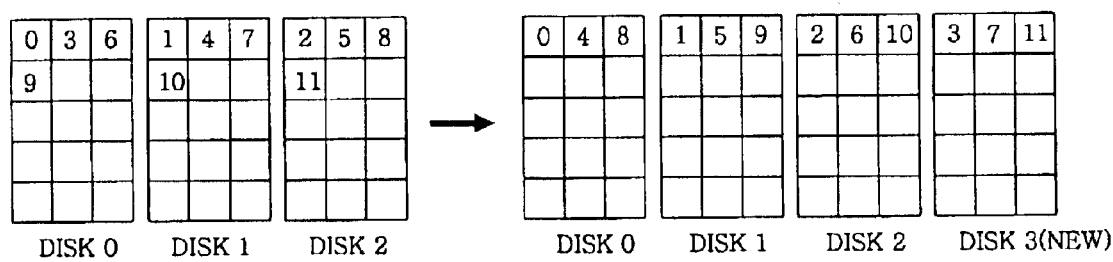
FIG. 2 shows a conventional example for rearranging existing data when a new disk is added.
Figure 3:
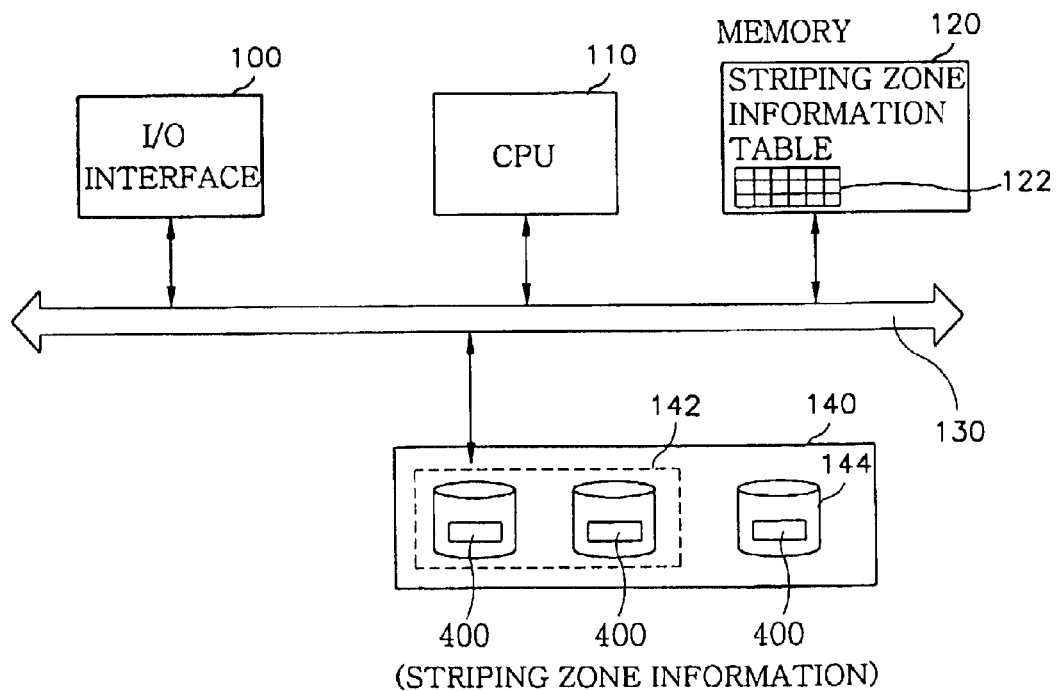
FIG. 3 depicts a striping system in accordance with the present invention.

FIG. 3 is a configuration diagram for showing a striping system in accordance with the present invention. Referring to FIG. 3, the inventive system includes an I/O interface 100, a CPU 110, a memory 120, a bus line 130 and a storage medium 140.

The I/O interface 100 transmits I/O data of a host processor (not shown) and the system. A striping zone information table 122 of total disks, in which a physical address of data recorded in a disk of the storage medium 140 is converted into a logic address, is stored in the memory 120. The striping zone information table 122 includes a zone number, the number of total disks, the number of participating disks, a first physical address, a last physical address, a first logic address and a last logic address.

The CPU 110 modifies the striping zone information table 122 stored in the memory 120 (refer to a table 2) in order to exactly acquire a mapping relation between a logic and a physical address required for data I/O of a disk in case a new disk 144 is added to the storage medium 140. In this case, the modification of the table 122 is carried out by adding striping zone information of the added disk to the table 122. Next, the CPU 110 stores the modified table 122 in the memory 120. Then, the CPU 110 seeks locations of a corresponding disk D and a physical block B by converting a logic address of reading/writing data into a physical address thereof in response to a disk reading/writing instruction. In this case, the conversion is carried out according to the following Eq. (2) with reference to the table 122. Then, the CPU 110 controls reading out the data from the physical block B or writing the data onto the disk D.

TABLE 2

| zone No. | the number of total disks | the number of participating disks | first physical address | last physical address | first logic address | last logic address |
|---|---|---|---|---|---|---|

The zone No. is a number representing a striping zone in the table 2 and is sequentially increased in accordance with the first logic address. The number of the total disks exhibits the total disks in a corresponding striping zone. The number of the participating disks is the number of disks participating in the corresponding striping zone. The first logic address and the last logic address indicate a first logic address and a last logic address of the corresponding striping zone, respectively. At this time, physical block numbers on a disk become the first and the last physical address.

$$D=((logBlkNo) \% parDevice)+(totalDevice-parDevice)$$

$$B=(logBlkNo-logStartNo) / parDevice+phyStartNo \qquad Eq. (2)$$

wherein D is a disk number storing a logic block n; B is a physical address number inside a disk mapped in the logic block n; logBlkNo is an address of the logic block n; logStartNo is a start address of a striping; phyStartNo is a physical block number on a disk of logBlkNo; parDevice is the number of disks participating in the striping; and totalDevice is the number of total disks.

An I/O interface 100, a CPU 110, a memory 120 and a storage medium 140 are connected in the bus line 130.

It is understood by those skilled in the art that there are at least two predetermined disks 142 and newly added disks 144 in the storage medium 140 and the new disks 144 can be added for expanding a system capacity during a system operation. Especially, the striping zone information 400 of each disk is stored in a first block of a corresponding striping zone of the disk. Also, it is preferable that the disks in the storage medium 140 of the present embodiment have the same capacity and the same size of a physical block. This is because the striping zone information table and the mapping equation between a logic and a physical address are complicated and should be changed in case a data striping is performed in disks having a different capacity.

The striping zone information 400 and the table 122 thereof should be stored in both a disk and a memory 120 of the storage medium 140 in the present invention. This is because all the striping zone information can be lost if the system power is off and the system is rebooted when the information is stored only in the memory 120. To avoid this, the information should be mirrored in a first block of a corresponding striping zone in a disk participating in a striping as well as the memory 120. Thus, a striping is performed after firstly reading the striping zone information 400 from the disk if the system is rebooted.

Figure 4:
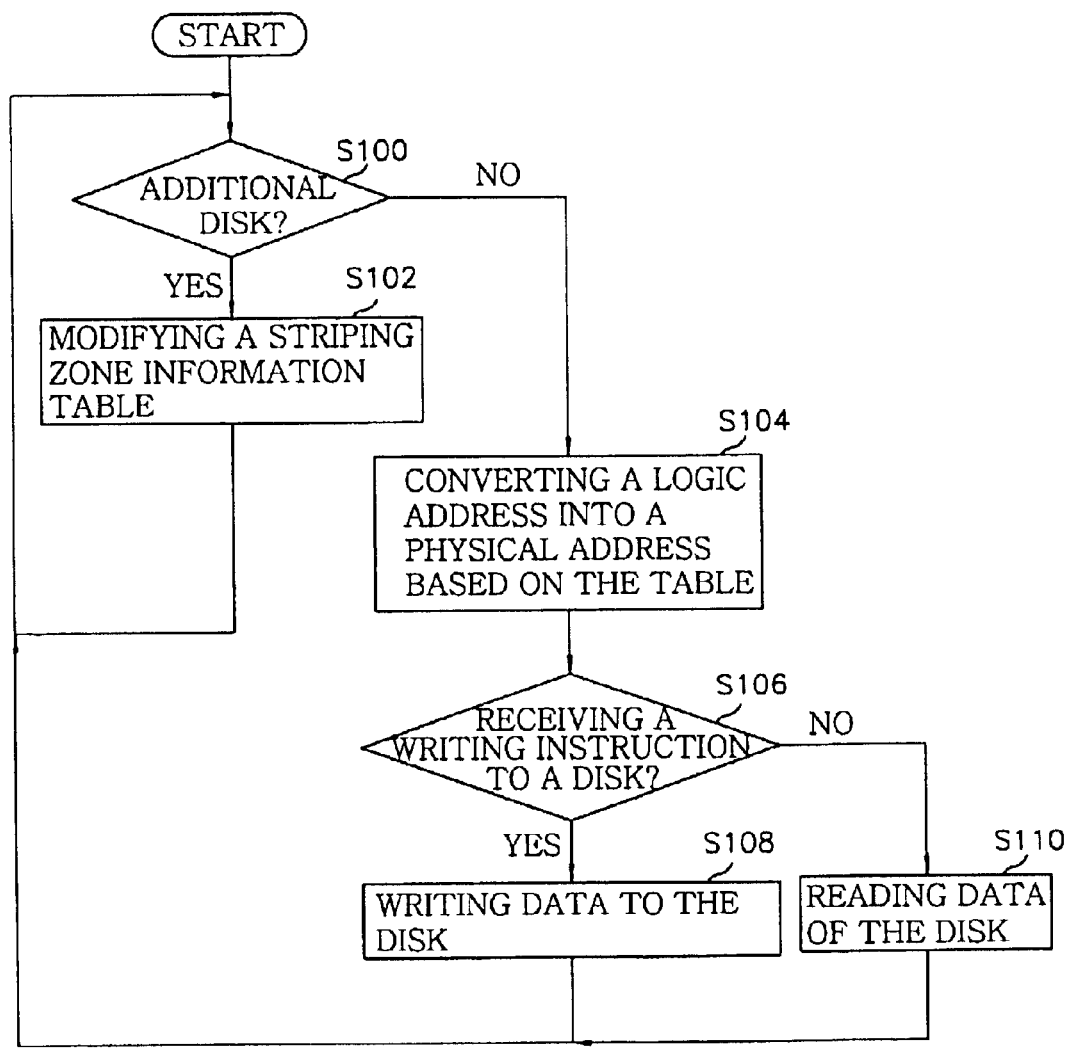
FIG. 4 is a flowchart for representing a mapping and processing method of a striping system in accordance with the present invention.

The striping system of the present invention performs a data striping by using a mapping and processing method as shown in FIG. 4, which provides a flowchart for the mapping and processing method of the striping system in accordance with the present invention.

The system checks whether there is an additional disk in the storage medium 140 (step 100). If it is found in the step 100 a new disk is added, striping zone information of the new disk is added in the striping zone information table 122 stored in the memory 120 to modify the table 122 to thereby store the modified table in the memory 120 (step 102). That is, the modification of the striping zone information table 122 is to modify a first logic address and a last physical address of current striping zone information, to add striping zone information to the table 122 and to modify information of a zone after the added zone. The striping zone information table 122 is renewed whenever a disk is added.

After storing the modified striping zone information table 122 in the memory 120 as described above, it returns to the step 100 in the system and the system checks again whether there is an additional disk or not. Next, if the additional new disk is not detected, the system prepares reading out/writing data.

Then, the system converts a logic address of data of the striping zone information table 122 to be written into a physical address thereof by using the Eq. (2). Next, a striping zone is determined by searching a position of a disk D to be written and a physical block B (step 104).

Further, in case a disk writing instruction is received (step 106), the system writes data to a disk D to be written and the physical block B inside the striping zone of the disk based on the converted information of the table in the step 104 (step 108).

If the disk writing instruction is not received in the step 106, on the other hand, the system reads out data of the disk D to be read out and the physical block B inside the striping zone of the disk based on the converted information of the table in the step 104 (step 110).

Figure 5A:
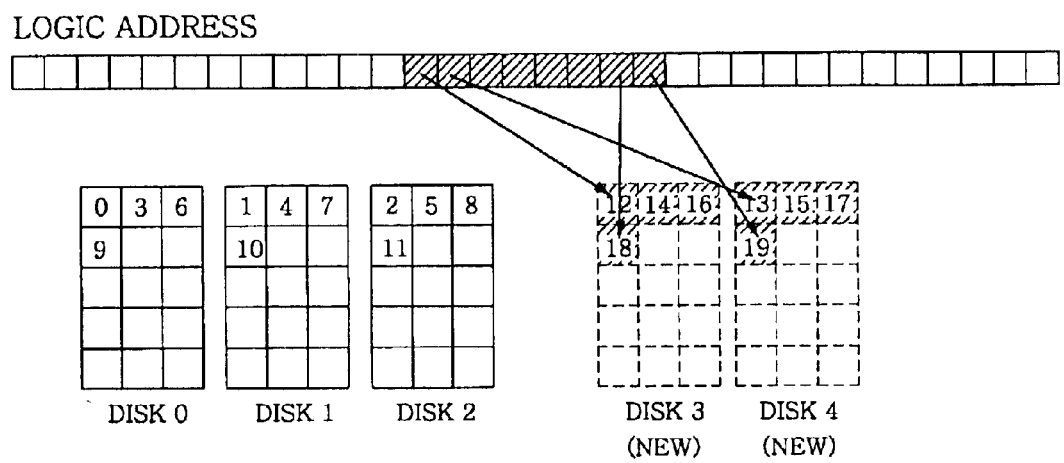
FIGS. 5A and 5B present an exemplary diagram for recording data by using a striping zone information table and converting a logic address into a physical address when a new disk is added in accordance with the present invention.
Figure 5B:
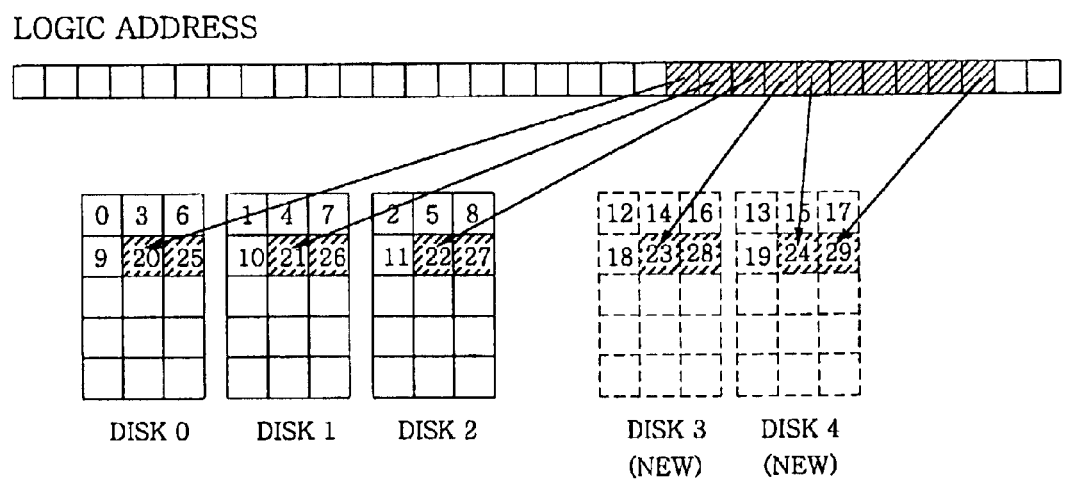

FIGS. 5A and 5B describe an exemplary diagram for recording data by using the striping zone information table and converting a logic address into a physical address when a new disk is added in accordance with the present invention.

FIG. 5A provides a process for recording in two disks new data excepting existing data by using a striping technique when two new disks Disk3 and Disk4 are added in a system where data is recorded in three disks Disk0 to Disk2.

To be specific, data of addresses 0–11 are sequentially recorded in four data blocks of the three disks Disk0 to Disk2, respectively. An initial state of the string zone information table stored in the memory is shown in a table 3 as follows.

TABLE 3

| zone No. | the number of total disks | the number of participating disk | first physical address | last physical address | first logic address | last logic address |
|---|---|---|---|---|---|---|
| 0 | 3 | 3 | 0 | 0 | 0 | 45 |

A table 4 depicts a striping zone information table modified when two new disks Disk3 and Disk4 are added during writing logic addresses 9–11 on a system that is being operated by the three disks Disk0 to Disk2 as follows.

TABLE 4

| zone No. | the number of total disks | the number of participating disks | first physical address | last physical address | first logic address | last logic address |
|---|---|---|---|---|---|---|
| 0 | 3 | 3 | 0 | 0 | 0 | 11 |
| 1 | 5 | 2 | 0 | 3 | 12 | 19 |
| 2 | 5 | 5 | 4 | 15 | 20 | 75 |

Thus, there are two additional disks Disk3 and Disk4 in participating a striping in a striping zone 1 and data of logic addresses 12–19 are written sequentially on four data blocks of physical addresses 0–3 inside each disk.

After finishing writing on the striping zone 1 as described above, writing on a striping zone 2 shown in the table 4 is performed. A writing process of the striping zone 2 is shown in FIG. 5B. At this time, there are five disks participating in the striping and the striping is performed in all the five disks. In other words, data of logic addresses 20–75 are sequentially written on 12 data blocks of physical addresses 4–15 of each disk.

Therefore, the present invention performs a data striping only in a newly added disk in case there is the newly added disk in a system when data is inputted to a disk or outputted therefrom. On the other hand, if there is no newly added disk, the present invention stores the data only in an existing disk by using a striping technique.

Figure 6:
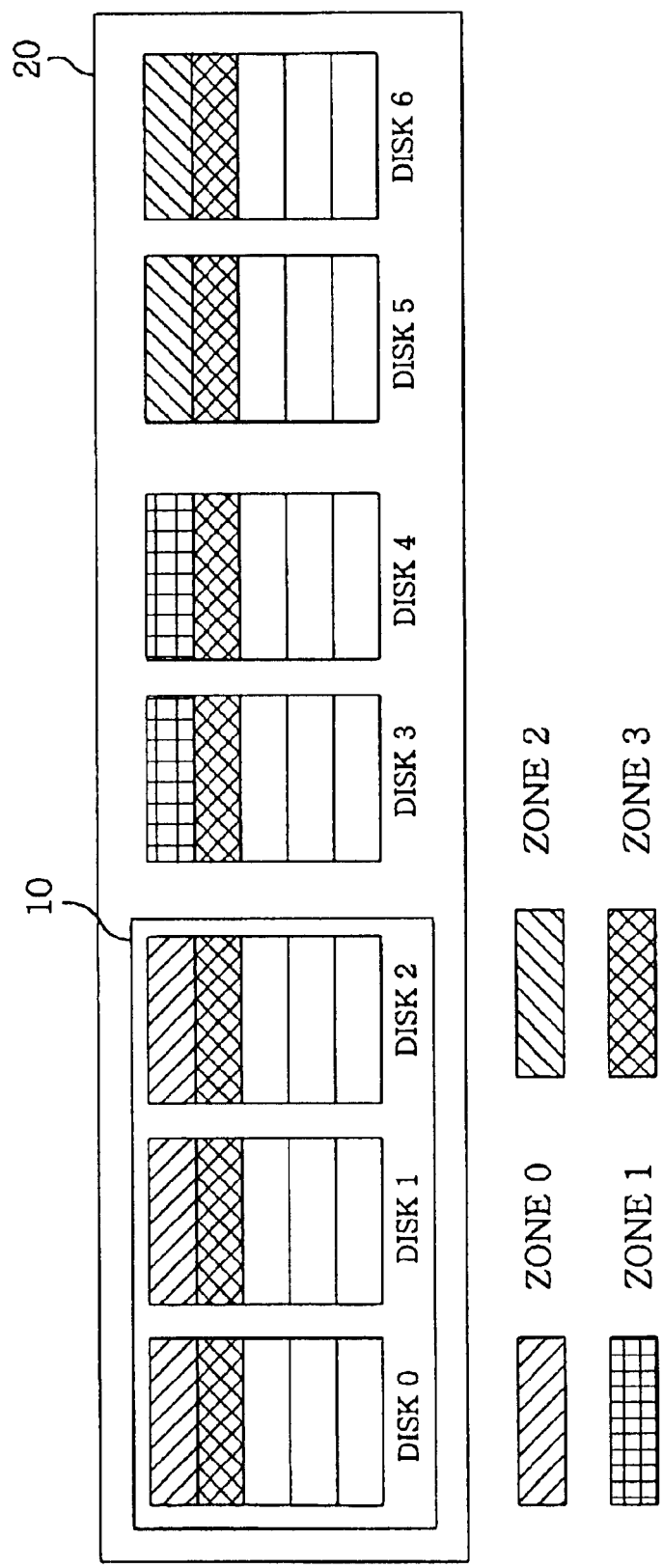
FIG. 6 illustrates an exemplary diagram for recording data in a disk whenever a new disk is added in accordance with the present invention.

FIG. 6 shows an exemplary diagram for recording data in a disk whenever a new disk is added in accordance with the present invention.

As shown in FIG. 6, data is written on 20% of all data blocks in three disks 10 (Disk0 to Disk2), respectively. This zone is indicated as a first striping zone Zone0.

If there are added two disks Disk3 and Disk4 during a writing of the three disks Disk0 to Disk2, data is written on a striping zone Zone1 of the added two disks by using a striping technique as same as on the Zone0. If there are added two more disks Disk5 and Disk6 during writing on the added disks Disk3 and Disk4, data is written on a striping zone Zone2 of newly added disks Disk5 and Disk6 by using a striping technique. At this time, the amount of the written data is the same as that of the three disks Disk0 to Disk2 and that of the added two disks Disk3 and Disk4, i.e., 20%. Then, data is written in order on a striping zone Zone3 of all the seven disks Disk0 to Disk6. A reference number 20 that is not described presents total disk blocks.

Therefore, in the present invention, when disk is added to a data striping system, a data striping is performed in the added disk without rearranging data of total disks as shown in the prior art until the amount of data of the added disk becomes the same as that of an existing disk. Then, the data striping is performed for the total disks, which can reduce an overhead caused by rearranging the data when expanding a system capacity.

Further, striping zone information is stored in a table in a memory in the present invention. When writing and reading out data, a logic address is converted into a physical address in the table by using an equation. Then, locations of a corresponding disk D and a physical block B can be found to write/read out the data by using the physical address, so that simplicity and flexibility by an equation and a table are realized.

While the present invention has been shown and described with respect to the preferred embodiment, it will be understood by those skilled in the art that various changes and modifications may be made without departing from the spirit and scope of the present invention as defined in the following claims.

What is claimed is:

1. A system having RAID levels, comprising:
a storage medium for having at least two disks;
a memory for storing a striping zone information table of total disks in which a physical address of data recorded in a disk of the storage medium is converted into a logic address; and
CPU for modifying a striping zone information table stored in the memory in case a new disk is added to the storage medium, storing the modified striping zone information table in the memory, converting a logic address of data to be written/read out from the stored table into a physical address in response to writing/reading instructions of the disk, searching positions of a corresponding disk D and a physical block B and controlling writing or reading out the data, wherein the CPU converts the logic address into the physical address by using an equation as follows:

$$D=((logBlkNo) \% parDevice))+(totalDevice-parDevice)$$

$$B=(logBlkNo-logStartNo)/parDevice+phyStartNo$$

wherein D is a disk number storing a logic block n; B is a physical address number inside a disk mapped in the logic block n; logBlkNo is an address of the logic block n; logStartNo is a start address of a striping; phyStartNo is a physical block number on a disk of logBlkNo; parDevice is the number of disks participating in a striping; and totalDevice is the number of total disks.

2. The system of claim 1, wherein the disk has the same capacity thereof and the same size of a physical block.

3. The system of claim 1, wherein the striping zone information table further includes zone number, the number of total disks, the number of participating disks, a first physical address, a last physical address, a first logic address and a last logic address.

4. A method for mapping and processing a logic address to a physical address of a system having RAID levels when there is an additional disk therein, comprising the steps of:
(a) determining whether there is an additional disk in a storage medium of the system;
(b) modifying a striping zone information table stored in the memory in case there is the additional disk in the storage system and storing the modified striping zone information table in the memory;
(c) determining whether the disk writing instruction is received in case there is no additional disk after storing the modified striping zone information table; and
(d) converting, if the disk writing instruction is received, a logic address of data to be written from the stored table into a physical address, searching positions of a corresponding disk D and a physical block B and writing data thereon, wherein the conversion of the logic address and the physical address in the step (d) is carried out by using an equation as follow:

$$D=((logBlkNo) \% parDevice))+(totalDevice-parDevice)$$

$$B=(logBlkNo-logStartNo)/parDevice+phyStartNo$$

wherein D is a disk number storing a logic block n; B is a physical address number inside a disk mapped in the logic block n; logBlkNo is an address of the logic block n; logStartNo is a start address of a striping; phyStartNo is a physical block number on a disk of logBlkNo; parDevice is the number of disks participating in a striping; and totalDevice is the number of total disks.

5. The method of claim 4, further comprising the step of converting, if the disk writing instruction is not received, a logic address of data to be read from the striping zone information table stored in the memory into a physical address, searching positions of a corresponding disk D and a physical block B and writing data thereon.

6. The method of claim 5, wherein the conversion of the logic address and the physical address in the step is carried out by using an equation as follow:

$$D=((logBlkNo) \% parDevice))+(totalDevice-parDevice)$$

$$B=(logBlkNo-logStartNo)/parDevice+phyStartNo$$

wherein D is a disk number storing a logic block n; B is a physical address number inside a disk mapped in the logic block n; logBlkNo is an address of the logic block n; logStartNo is a start address of a striping; phyStartNo is a physical block number on a disk of logBlklNo; parDevice is the number of disks participating in a striping; and totalDevice is the number of total disks.

* * * * *